United States Patent [19]

Himmler

[11] Patent Number: 5,239,867
[45] Date of Patent: Aug. 31, 1993

[54] METHOD AND APPARATUS FOR IMPROVING THE FIT OF A PNEUMATIC TIRE ON A MOTOR VEHICLE WHEEL

[75] Inventor: Günther Himmler, Darmstadt, Fed. Rep. of Germany

[73] Assignee: Hofmann Maschinenbau GmbH, Pfungstadt, Fed. Rep. of Germany

[21] Appl. No.: 727,403

[22] Filed: Jul. 9, 1991

[30] Foreign Application Priority Data

Aug. 28, 1990 [DE] Fed. Rep. of Germany ....... 4027097

[51] Int. Cl.$^5$ ............................................. G01M 1/16
[52] U.S. Cl. ........................................ 73/462; 73/460
[58] Field of Search ................. 73/459, 460, 462, 146, 73/66

[56] References Cited

U.S. PATENT DOCUMENTS

| | | | |
|---|---|---|---|
| 4,223,386 | 9/1980 | Maruyama et al. | 73/462 |
| 4,285,240 | 8/1981 | Gold | 73/462 |
| 4,302,966 | 12/1981 | Ohnishi et al. | 73/459 |
| 4,445,372 | 5/1984 | Buzzi | 73/459 |
| 4,507,964 | 4/1985 | Borner et al. | 73/462 |
| 4,817,429 | 4/1989 | Goebel | 73/459 |

*Primary Examiner*—John E. Chapman
*Attorney, Agent, or Firm*—Cushman, Darby & Cushman

[57] ABSTRACT

In a method and apparatus for improving the fit of a pneumatic tire on a motor vehicle wheel rim, before a wheel balancing operation is carried out the wheel is accelerated to a maximum permissible peripheral speed and centrifugal force acting at the wheel is measured at that speed. The drive for the wheel with tire thereon is stopped when the measured variation in centrifugal force reaches or falls below a predetermined limit value.

11 Claims, 1 Drawing Sheet

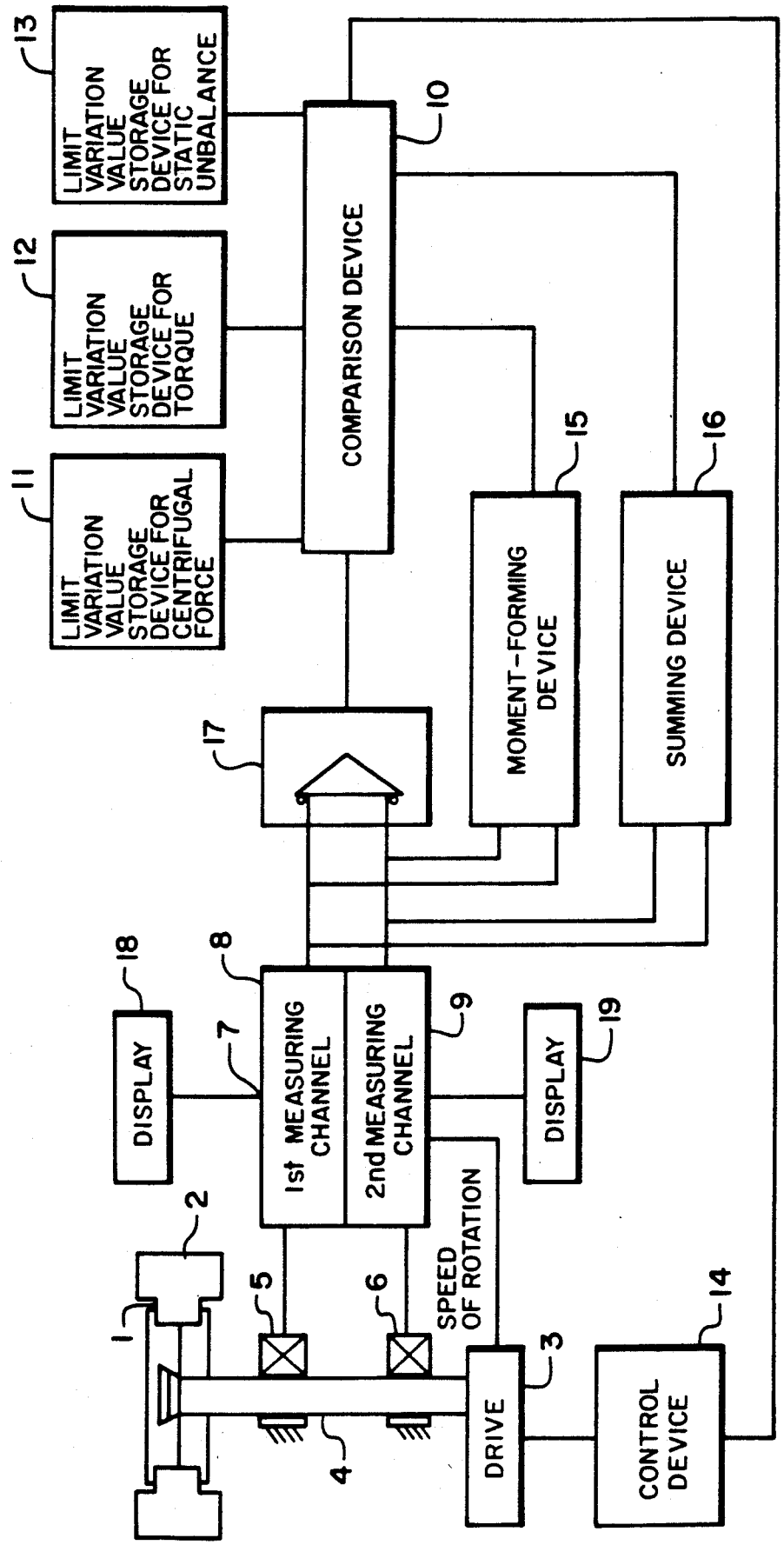

METHOD AND APPARATUS FOR IMPROVING THE FIT OF A PNEUMATIC TIRE ON A MOTOR VEHICLE WHEEL

BACKGROUND OF THE INVENTION

In the light of the operating requirements of modern motor vehicles, for example increased speeds and greater road-holding stresses, there is a need for the fit of pneumatic tires on the motor vehicle wheels to be improved. That aim may be achieved for example by deformation of the pneumatic tire when it is fitted on to the motor vehicle wheel or more specifically the rim thereof, with the deformation forces being applied to the tire by means of an array of rollers which bear against the tire, as disclosed for example in German laid-open applications (DE-OS) Nos 34 42 561 and 38 23 721. However that procedure requires additional and relatively expensive equipment to provide an improved fit for the beads of the tire on the rim portions of the disc wheel. Furthermore such a procedure and the equipment which is used to carry out the procedure do not always exclude the possibility of damage to the tire.

SUMMARY OF THE INVENTION

An object of the present invention is to provide a method of improving the fit of a pneumatic tire on a motor vehicle wheel without involving deformation tools acting directly on the tire.

Still another object of the present invention is to provide a method of improving the fit of a pneumatic tire on a motor vehicle wheel rim which is quick and easy to perform while nonetheless affording reliable results.

Still another object of the present invention is to provide an apparatus for improving the fit of a pneumatic tire on a motor vehicle wheel which is of a simple structure and gives accurate results without involving the use of substantial mechanical forces applied to the tire on the wheel.

In accordance with the method aspect of the present invention, the foregoing and other objects are achieved by a method of improving the fit of a pneumatic tire on the rim of a motor vehicle wheel after the tire has been fitted thereon wherein prior to a balancing operation the motor vehicle wheel is driven up to a maximum permissible peripheral speed and centrifugal force at the wheel is measured while that peripheral speed is maintained. The drive to the wheel is stopped when the variation of the measured centrifugal forces does not exceed a predetermined limit value and the wheel is rotating at its maximum permissible peripheral speed below a predetermined limit variation value.

The motor vehicle wheel is then prepared for an unbalance measuring operation, to provide for proper balancing thereof.

In the method according to the invention, the motor vehicle wheel is thus rotated at its maximum peripheral speed. In that situation, the fitted pneumatic tire is subjected to centrifugal forces which provide for an improvement in or stabilization of the fit of the pneumatic tire beads at the rim portions of the wheel. Because the centrifugal forces involved are simultaneously observed and measured while the wheel with tire thereon is being rotated at the maximum permissible peripheral speed thereof, the variation in respect of time of the measured centrifugal forces provides information about the effect in terms of stabilization of the fit of the tire bead on the wheel. If, when the maximum permissible peripheral speed is reached, the variation in measured centrifugal forces does not exceed a predetermined limit value, that is an indication that the tire already enjoys a stable fit on the rim portions of the wheel. The drive is then stopped and the assembly of the wheel with tire thereon is brought to a halt. If however when the maximum permissible peripheral speed of the wheel is reached, the variation of the measured centrifugal forces as the wheel rotates exceed the predetermined limit value, the wheel with tire is maintained in the condition of rotating at its maximum peripheral speed until the variation of the measured centrifugal force reaches or falls below the predetermined limit value. Furthermore, other parts of the tire are also subjected to loadings by the centrifugal forces, whereby stresses in the tire which may have been caused in manufacture of the tire or when the tire was fitted on to the rim of the wheel can be eliminated.

In a preferred form of the method according to the invention, the centrifugal forces can be measured in first and second planes of the motor wheel, in particular the unbalance compensating planes, that is to say the planes in which, for example, weights may be applied to the wheel for the purposes of compensating for unbalance thereof. It is possible to ascertain therefrom variation of a torque generated by dynamic unbalance and a variation of centrifugal forces caused by static unbalance, and it is thus possible to arrive at an assessment of the fit of the tire on the wheel by comparison with suitable limit variation values. There limit variations values may be set in such a way as to be typical of a given tire, or tire-specific.

In another preferred feature of the invention, the operation of accelerating the wheel with tire up to the maximum permissible peripheral speed thereof can be repeated a number of times, and the operation of measuring centrifugal force can be carried out at a uniform maximum peripheral speed. It may also be advantageous to vary the acceleration used in the phase of accelerating the wheel to its maximum permissible peripheral speed. Then, constantly varying centrifugal forces act on the tire, which forces can result in quicker stabilization of the fit of the tire beads on the rim portions of the wheel.

Preferably, the entire operation can be carried out on a separate machine which is disposed in terms of time downstream of a tire fitting installation and/or downstream of a tire working machine or bead releasing machine, but upstream of a balancing machine.

In the event that the centrifugal forces are to be measured in the two unbalance compensating planes of the motor vehicle wheel, the centrifugal force measurement operation may also be carried out on a balancing machine. However the unbalance measuring operation is only effected when the method according to the invention involving measurement of centrifugal forces and comparing variations thereof with predetermined limit variation values has been carried out to ensure that the tire enjoys a stable fit on the rim of the motor vehicle wheel. If the wheel is balanced after the method according to the invention has been carried into effect, that can ensure that in operation the wheel with tire not longer suffers from unbalance or alterations in unbalance, which depend on the speed of rotation in operation of the wheel.

In accordance with the present invention, in the apparatus aspect thereof, an apparatus for improving the fit of a pneumatic tire on a motor vehicle wheel comprises a rotatably mounted spindle for carrying a motor vehicle wheel in a clamped centered condition thereon, and a motor for driving the spindle in rotation. Operatively associated with the spindle are centrifugal force measuring means, in turn connected to a comparison means. A storage means for storing centrifugal force limit variation values is operatively connected to the comparison means, while a control means is operatively connected to the spindle drive motor and to the output of the comparison means.

In accordance with a preferred feature of the apparatus of the invention, the centrifugal force measuring means comprise first and second measuring channels for measuring centrifugal forces in first and second planes of the wheel to be measured, while a further preferred feature of the invention provides that a means for forming a variation of the torque generated by dynamic unbalance from the measured centrifugal forces is connected to the outputs of the first and second measuring channels and also connected to the input side of the comparison means.

A further preferred feature of the apparatus of the invention provides that the outputs of the first and second measuring channels are connected to a summing means connected to the input side of the comparison means, to form a variation of resultant centrifugal force caused by a static unbalance.

Further objects, features and advantages of the present invention will be apparent from the following description of a preferred embodiment.

BRIEF DESCRIPTION OF THE DRAWING

FIG. 1 is a diagrammatic view of an embodiment of an apparatus in accordance with the principles of the present invention.

DESCRIPTION OF THE PREFERRED EMBODIMENT

Referring to FIG. 1, a motor vehicle wheel assembly comprising a disc wheel having a rim portion indicated at 1 and a pneumatic tire indicated at 2 which is fitted on to the rim portion 1 of the disc wheel is clamped in a centered condition on a rotatably supported spindle 4 in a manner which is conventional practice for example in relation to balancing machines. The wheel unit is thus held in position on the spindle by any suitable clamping mechanism. The spindle 4 is driven in rotation by a motor as indicated at 3.

Reference numerals 5 and 6 identify measurement value sensors or pick-ups, more especially force-measuring transducers, which are operatively applied to the spindle 4. The output signals produced by the pick-ups or sensors 5 and 6 are passed to first and second measuring channels 8 and 9 respectively of an electronic evaluation unit as indicated at 7. A display device 18 and 19 respectively may be connected to each measuring channel 8 and 9 of the electronic evaluation assembly 7.

The outputs of the first and second measuring channels 8 and 9 can be connected to a comparison unit 10 by way of a change-over switching device 17.

The outputs of the first and second measuring channels 8 and 9 are also connected to a torque-forming device 15 and to a summing device 16. In the drawing the torque-forming device 15 and the summing device 16 are connected directly to the respective outputs of the measuring channels 8 and 9, but it is also possible for the connection of the torque-forming device 15 and the summing device 16 to be made by way of the change-over switching device 17.

In the torque-forming device 15, a variation of torque generated by dynamic unbalance is formed from the two signals in respect of the centrifugal forces detected in the measuring channels 8 and 9. In the summing device 16, a variation of resultant centrifugal force generated by static unbalance is formed from the two centrifugal force signals. A signal corresponding to the centrifugal force moment is passed from the torque-forming device 15 as its output signal to the comparison device 10 while similarly an output signal corresponding to the variation of resultant centrifugal force generated by static unbalance is passed from the summing device 16 to the comparison device 10.

Reference numeral 11 in the drawing identifies a limit variation value storage device which is connected to the comparison device 10 and which is operable to store limit values in respect of centrifugal forces which are to be compared to the measured centrifugal forces from the first and second measuring channels 8 and 9. Reference numeral 12 identifies a limit variation value storage device which is operable to store limit values in respect of the centrifugal force moments which are compared in the comparison device 10 to the output signals of the moment-forming device 15. Reference numeral 13 identifies a limit variation value storage device 13 operable to store limit variation values in respect of resultant centrifugal forces which may also be considered as centrifugal forces, generated by static unbalance, which are compared in the comparison device 10 to the output signals of the summing device 16.

The output signals from the comparison device 10 which result from the above-described comparison operations performed by the comparison device 10 are passed from the latter to a control device 14. The comparison device 10 produces an output signal when the limit variation value stored in the respective limit value storage devices 11, 12 and 13 coincides with the measured value supplied by the electronic evaluation unit 7, possibly after further processing in the torque-forming device 15 and/or the summing device 16, or when the measured value is below the respective limit variation value. The signal which is passed to the control device 14 from the comparison device 10 causes the motor 3 to come to a stop, thereby terminating the drive to the wheel unit carried on the spindle 4.

While the centrifugal force measurement operations are being carried out, a signal which is proportional to the speed of rotation of the wheel unit is derived from the motor 3 or from the driven spindle 4, and continuously passed to the two measuring channels 8 and 9 so that the centrifugal force measurement operations can be performed for the respective speeds of rotation of the wheel unit, more especially for the maximum permissible peripheral speed which is to be selected in dependence on the respective types of tire involved. The display devices 18 and 19 serve to display the respectively measured centrifugal forces in the measuring channels 8 and 9.

The motor 3, the rotatably supported spindle 4 as well as the electronic evaluation unit 7 with the measuring sensors 5 and 6 and the two measuring channels 8 and 9 may also be part of a conventional unbalance measuring machine. The structural units required for carrying out the operating procedure according to he invention are then additionally connected to the conventional unbalance measuring machine, at two outputs of the evaluation unit 17. Those additional structural units are the comparison device 10 which can be connected to the measuring channels selectively by way of the change-over switching device 17, the limit variation value storage devices 11, 12 and 13 connected to the comparision device 10, the torque-forming device 15 and the summing device 16 which can also be connected between the outputs of the electronic unit 7 and the comparison device 10, and the control device 14 for switching off the motor 3 in dependence on the output signal from the comparison device 10.

As indicated above, the procedure involved in the method of improving the fit of a pneumatic tire on a motor vehicle wheel rim provides that, prior to a balancing operation, the wheel with tire thereon is accelerated up to its maximum permissible peripheral speed and then centrifugal forces acting at the wheel are measured while that peripheral speed is maintained. When the variation of the measured centrifugal force reaches or falls below a predetermined limit variation value, the drive provided by the drive motor 3 is stopped and the motor vehicle wheel with tire comes to a halt. The effect of the centrifugal forces acting at the wheel during an operational run cause the tire to be fitted on the motor vehicle wheel rim in a better and more stable fashion, and when an acceptable fit of the tire on the motor vehicle wheel rim is attained, the variation of the measured centrifugal forces, in relation to time, will thus fall below a limit value.

It will be appreciated that the above-described method and apparatus according to the present invention have been set forth solely by way of example and illustration of the principles of the invention and that various modifications and alterations may be made therein without thereby departing from the spirit and scope of the invention.

What is claimed is:

1. A method of improving the fit of a pneumatic tire on a rim of a motor vehicle wheel comprising the steps of:
    fitting the pneumatic tire on the rim;
    accelerating the wheel with the tire thereon to a maximum peripheral speed which is greater than a balancing speed;
    monitoring centrifugal forces generated by rotation of the wheel with the tire thereon;
    comparing variations in the mentioned centrifugal forces with a predetermined variation value; and
    maintaining the maximum peripheral speed until a condition is detected in which the variation in the monitored centrifugal forces is less than or equal to the predetermined variation value.

2. A method as set forth in claim 1 wherein centrifugal forces are measured in first and second planes of the motor vehicle wheel.

3. A method as set forth in claim 1 wherein the operation of accelerating the wheel up to said maximum permissible peripheral speed is repeated a plurality of times.

4. A method as set forth in claim 1 wherein the acceleration used in the phase of accelerating the wheel to said maximum permissible peripheral speed is varied.

5. A method as set forth in claim 2 wherein a torque generated by dynamic unbalance is determined from the centrifugal forces which are measured in said planes and compared to a torque limit variation value as a criterion in regard to switching off the drive.

6. A method as set forth in claim 2 wherein a limit variation value for a resultant from the centrifugal forces measured in said planes is used as a criterion in regard to switching off the drive.

7. A method as set forth in claim 2 wherein the centrifugal force measurement operations are carried out for the two unbalance compensating planes of the motor vehicle wheel.

8. Apparatus for improving the fit of a pneumatic tire on a rim of a motor vehicle wheel comprising:
    a spindle for carrying a motor vehicle wheel in a centered condition;
    means for rotatably supporting the spindle;
    means for driving the spindle in rotation;
    a centrifugal force measuring means for measuring centrifugal force generated by rotation of the wheel, the centrifugal force measuring means including sensors operatively associated with the spindle;
    storage means for storing a predetermined limit variation value of the centrifugal force;
    comparison means operatively connected to the centrifugal force measuring means and the storage means for comparing the stored predetermined limit variation value with the variation in the measured centrifugal force; and
    control means operatively connected to the output of the comparison means and the drive motor for controlling the drive motor according to comparison results.

9. Apparatus as set forth in claim 8 wherein the centrifugal force measuring means comprises first and second measuring channels for measuring centrifugal forces in first and second planes of the wheel.

10. Apparatus as set forth in claim 9, and further including means for forming a variation of torque generated by dynamic unbalance from the measured centrifugal force connected to the outputs of said first and second measuring channels and to the input side of said comparison means.

11. Apparatus as set forth in claim 9, and further including a summing means connected to the input side of the comparison means and connected to the outputs of the first and second measuring channels, for forming a resultant centrifugal force generated by static unbalance.

* * * * *